Figures 1, 2, 3:
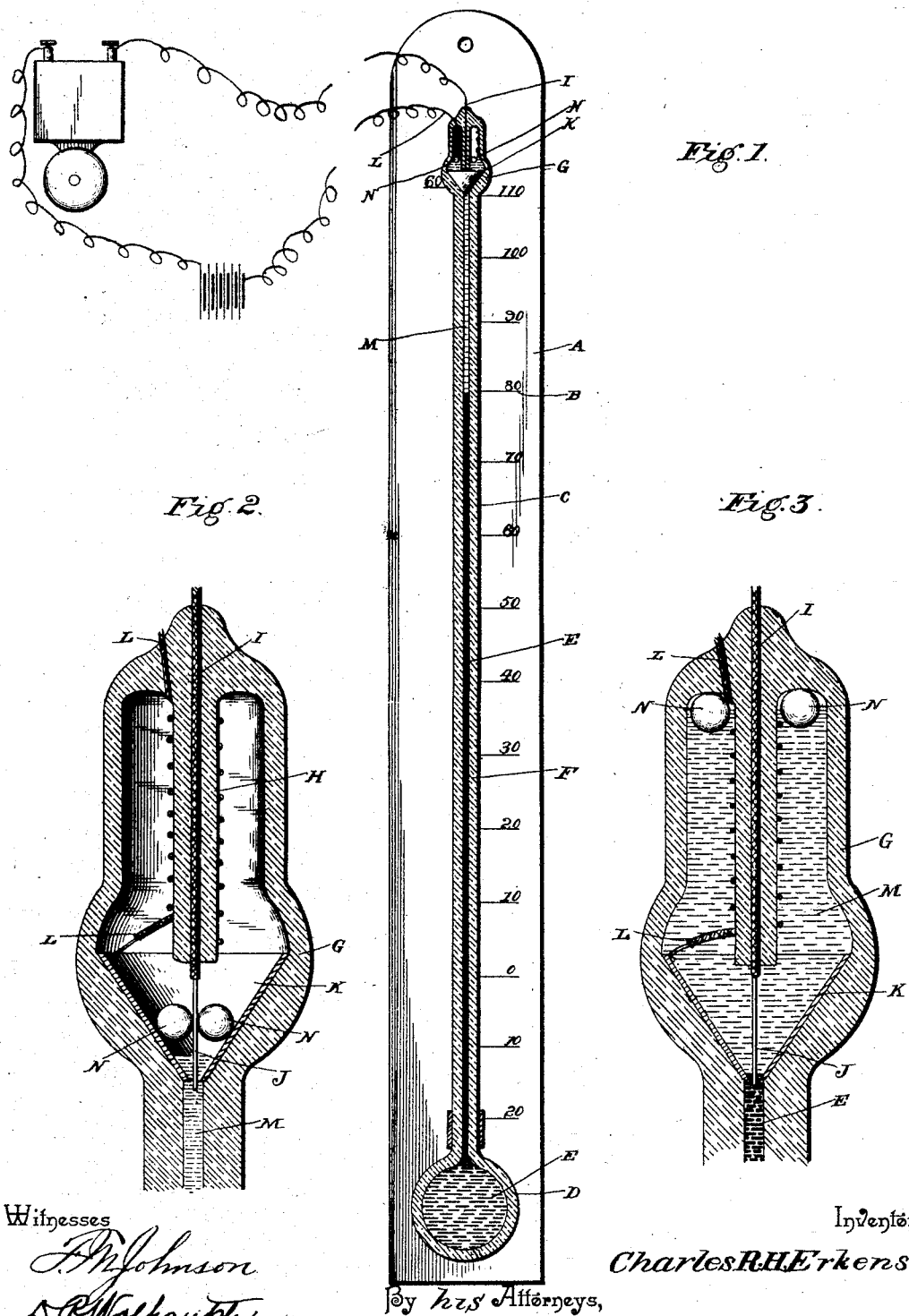

(No Model.)

C. R. H. ERKENS.
THERMOMETRIC INDICATOR.

No. 489,075. Patented Jan. 3, 1893.

Witnesses
F. N. Johnson
S. P. Wolhaupter

Inventor
Charles R. H. Erkens
By his Attorneys,
C. A. Snow & Co.

UNITED STATES PATENT OFFICE.

CHARLES REINHARD HENRY ERKENS, OF LAKEWOOD, NEW YORK.

THERMOMETRIC INDICATOR.

SPECIFICATION forming part of Letters Patent No. 489,075, dated January 3, 1893.

Application filed September 15, 1892. Serial No. 445,966. (No model.)

*To all whom it may concern:*

Be it known that I, CHARLES REINHARD HENRY ERKENS, a citizen of the United States, residing at Lakewood, in the county of Chautauqua and State of New York, have invented a new and useful Thermometric Indicator, of which the following is a specification.

This invention relates to thermometric indicators; and has for its object to provide an improved construction of thermometer, in which is furnished simple and efficient means for closing a circuit, completed through an annunciator or alarm, so as to indicate when either the maximum or the minimum of the two points or degrees between which it is desired to maintain the temperature, has been attained.

To this end the invention is especially adapted for use in all places where a certain range of temperature must be maintained.

With these and many other objects in view which will readily appear, the invention consist in the novel construction, combination and arrangement of parts hereinafter more fully described, illustrated and claimed.

In the accompanying drawings:—Figure 1 is a vertical longitudinal sectional view of a thermometric indicator constructed in accordance with this invention. Fig. 2 is an enlarged detail sectional view showing the circuit closed to indicate the minimum or low temperature. Fig. 3 is a similar view showing the circuit closed to indicate the maximum or high temperature.

Referring to the accompanying drawings:—
A represents a suitable board or frame provided with the usual graduated thermometric scale B, and to which is suitably secured the thermometer C. The thermometer C, consists of the glass bulb D, at the lower end of the same, which accommodates the bulk of the mercury E, and the upright tube F, leading from the bulb D, and in which the column of mercury rises and falls according to the degree of temperature as in all thermometers. In the present invention the thermometer tube F, terminates at its upper end in an elongated bulb G, flaring out from the upper terminal of the small bore of the tube F, and inclosing the integral downwardly projecting core H, through which passes one of the circuit wires I. The said circuit wire I, is connected in a suitable alarm circuit as illustrated, and being inlaid in the glass core H, the same only has the lower inner bared contact end J, thereof, exposed. The bared contact or electrode end J, of said circuit wire projects below the lower end of the core H, to a point at the juncture of the bulb G, with the tube F, and this bared end J, is surrounded by the metallic flared or funnel electrode K. The said flared or funnel electrode K, rests stationary within the bottom of the bulb G, at its juncture with the tube F, but is so arranged that the open apex thereof surrounds the extreme lower end of the bared electrode J, which slightly projects therethrough but out of contact therewith. The electrode K, has connected therewith the other circuit wire L, which, winding about the core H, passes through the top of the bulb G, and is connected in the same alarm circuit as the wire I, so that as the circuit is closed between the two electrodes, the alarm is sounded to indicate that either the maximum or minimum temperature has been reached. The column of mercury standing in the tube F, supports and carries a supplemental column M, of a non-conducting fluid, such as glycerine, and which fluid rises and falls within the tube F, and also in the bulb G, at the extreme upper end of said tube. The column of non-conducting fluid M, floats upon the upper surface thereof the hollow metallic contact balls N, which rise and fall with said fluid. As long as the mercury varies between the two degrees of temperature, which are the limits to be reached, the two contact balls are floated by the liquid M, within the bulb G above the funnel electrode K, and therefore the circuit remains open. But when the temperature lowers, the mercury falls and therefore allows the glycerine, or other similar fluid, to also lower and drop the balls N, into the funnel K. When the balls pass into the funnel K, the same touch both electrodes, and therefore complete the previously open circuit, which immediately causes the alarm to be sounded. On the other hand, when the temperature rises, the balls are carried by the fluid M, to the top of the bulb G, while the mercury having risen to the top of the bore of the tube F, fills the space at the open apex of the funnel K, between the latter and the bared electrode end of the wire I, and thereby closes the circuit to set the alarm ringing, to indicate that the maximum degree of temperature has been reached.

It is thought from the foregoing description that the operation and many advantages of the herein described thermometric indicator will be quite apparent to those skilled in the art.

Having thus described my invention, what I claim as new and desire to secure by Letters Patent is:—

1. In a thermometric indicator, the combination of a thermometer tube, electric alarm circuit wires terminating in electrode ends within said thermometer tube and out of contact with each other, the mercury in said tube adapted to close the circuit between the wire terminals when it rises to a given point, and supplemental circuit closing devices adapted to be lowered onto the wire terminals by the fall of the mercury and to close the circuit there-between independently of the mercury when it has fallen to a given degree, substantially as set forth.

2. In a thermometric indicator, the combination of the thermometer tube, the mercury within said tube, a non-conducting fluid supported by the column of mercury, electric alarm circuit wires terminating within said thermometer tube in electrode ends normally out of contact with each other, and contact devices floated by said non-conducting fluid above the electrode ends of said wires, substantially as set forth.

3. In a thermometric indicator, a thermometer tube terminating at its upper end in a supplemental bulb, the mercury within said tube, a non-conducting fluid supported by the mercury, electric alarm circuit wires terminating in said bulb in electrode ends normally out of contact, and metallic contact balls floated by said fluid within the bulb and adapted to close the circuit between said electrodes when the mercury and said fluid lowers, said mercury forming in itself a closing contact between said electrodes when it rises to a certain point, substantially as set forth.

4. In a thermometric indicator, a thermometer tube terminating at its upper end in an elongated supplemental bulb, the mercury within said tube, a non-conducting fluid supported by the column of mercury, a flared or funnel shaped electrode supported at the upper end of the tube within said bulb and having an open apex, electric alarm circuit wires terminating within said bulb, one of said wires being connected to said electrode, and the other wire having a bared electrode-end projecting through and out of contact with the apex of said electrode, and metallic contact balls floated by said fluid within the bulb, substantially as set forth.

In testimony that I claim the foregoing as my own I have hereto affixed my signature in the presence of two witnesses.

CHARLES REINHARD HENRY ERKENS.

Witnesses:
JOHN C. MCVAY,
S. A. WINANS.